May 8, 1945.  H. WEIDNER  2,375,713
APPARATUS FOR SEPARATING SOLIDS FROM WATER
Filed Feb. 20, 1943  2 Sheets-Sheet 1
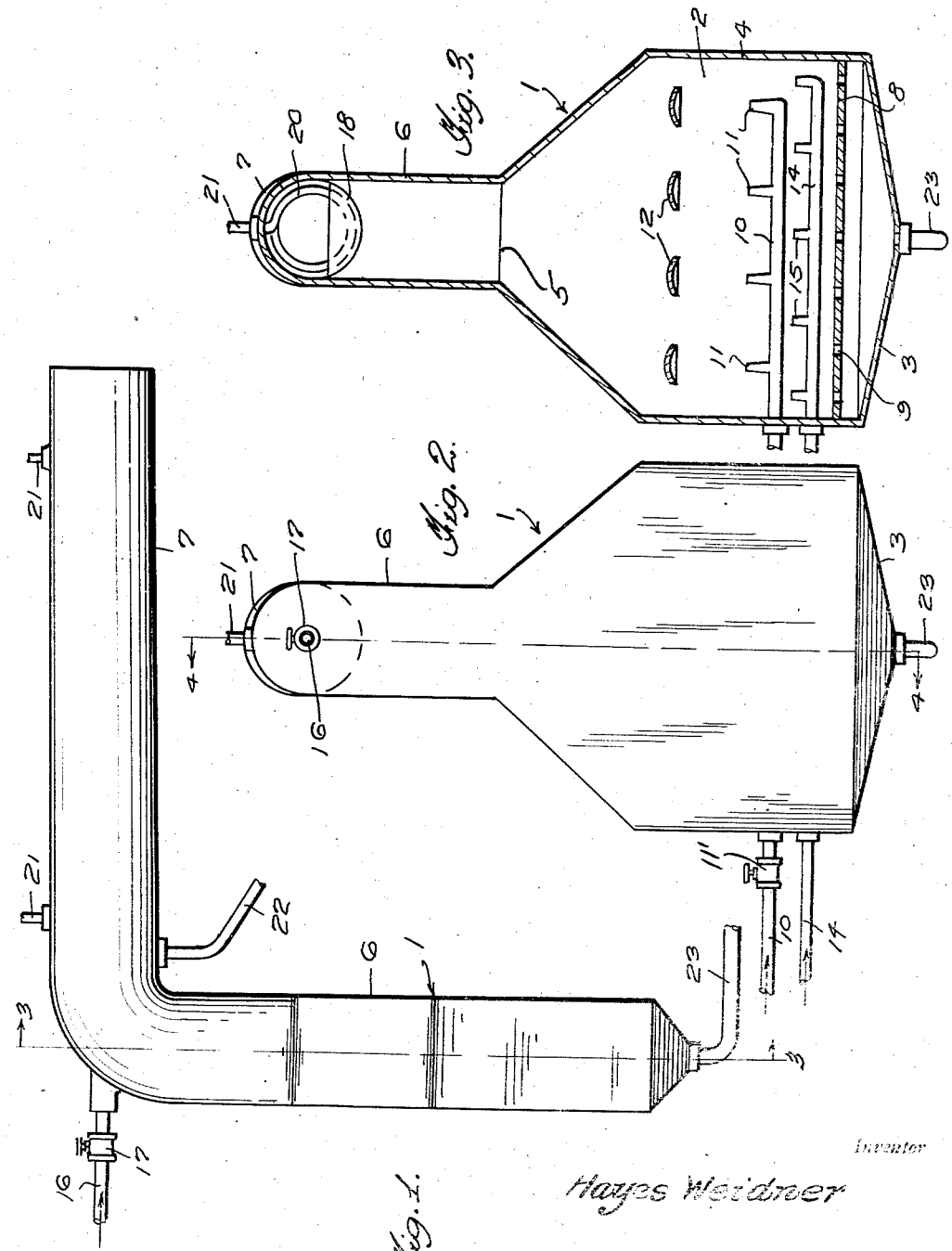
Inventor
Hayes Weidner
By Clarence A. O'Brien
and Harvey B. Jacobson
Attorneys

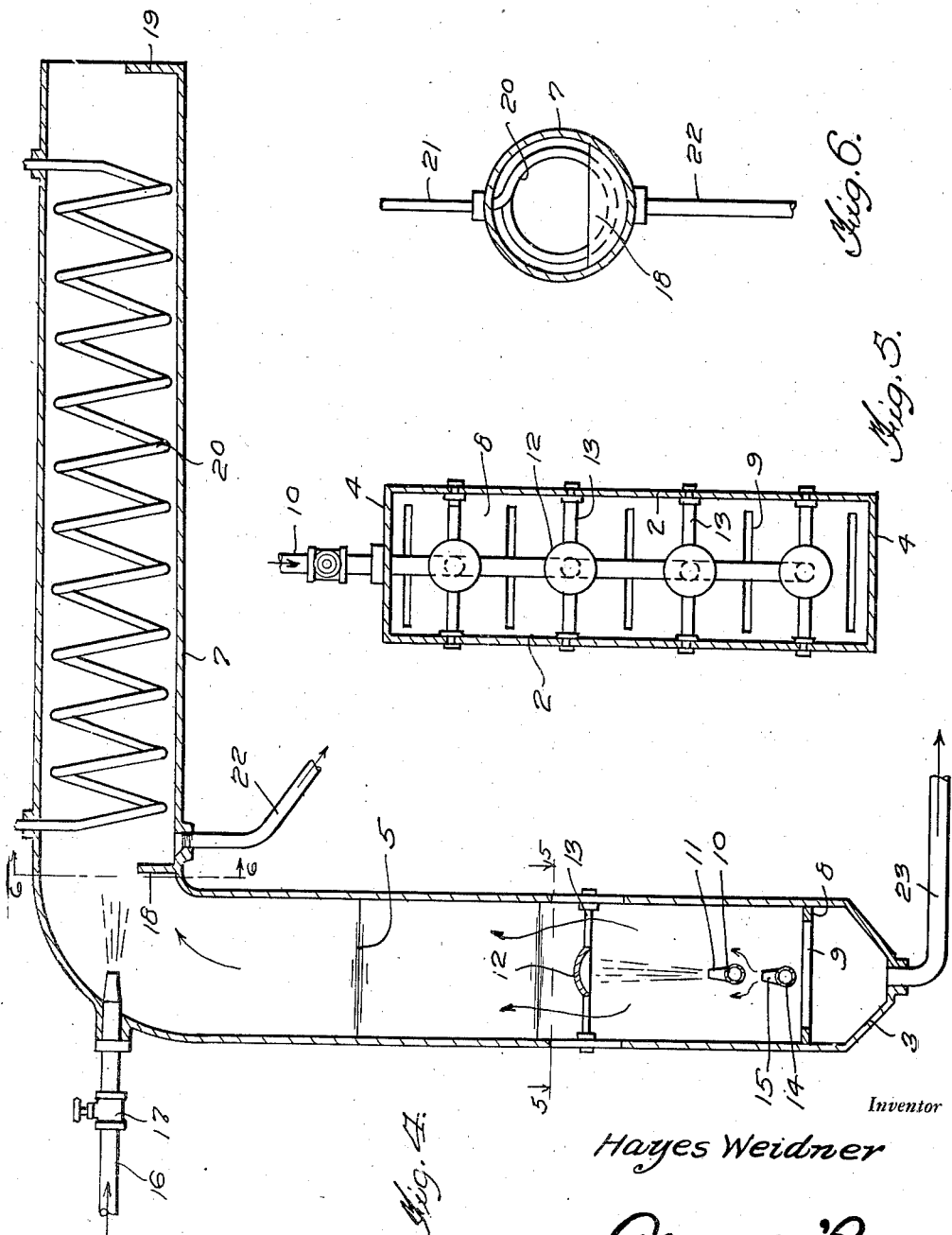

Patented May 8, 1945

2,375,713

UNITED STATES PATENT OFFICE 2,375,713

APPARATUS FOR SEPARATING SOLIDS FROM WATER

Hayes Weidner, Flagstaff, Ariz.

Application February 20, 1943, Serial No. 476,565

4 Claims. (Cl. 202—189)

My invention relates to improvements in apparatus for separating solids from water.

The principal object of my invention is to provide a practical apparatus for separating minerals from mineralized water with the end in view of reclaiming pure water and abstracting the minerals therefrom for commercial and other purposes.

Another object is to provide apparatus for the purpose above set forth which is simple in construction, adapted for substantially continuous operation and inexpensive to manufacture and install.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in side elevation of a preferred form of apparatus constructed in accordance with my invention, Figure 2 is a view in front elevation, Figure 3 is a view in vertical section taken on the line 3—3 of Figure 1, Figure 4 is a similar view taken on the line 4—4 of Figure 2, Figure 5 is a view in horizontal section taken on the line 5—5 of Figure 4, and Figure 6 is a view in transverse section taken on the line 6—6 of Figure 4.

Referring to the drawings by numerals, the illustrated apparatus comprises, as its basic element, a casing 1, of any suitable material, forming a lower water vaporising chamber 2 of narrow, rectangular form transversely and having a hopper bottom 3, and end walls 4 converging at the top of the chamber 2 to form a reduced outlet 5 at the top of the chamber. The outlet 5 opens into a vertical leg 6 of an elbow-type conduit, the other leg 7 of which forms a laterally extending tunnel at the upper end of the leg 6 inclining slightly toward said leg 6 for a purpose presently apparent.

In the lower part of the water vaporizing chamber, a horizontal grid plate 8 is provided in closely spaced relation to the bottom 3 of said chamber and which is provided with transversely extending slots 9 therein.

A horizontal water inlet pipe 10 extends through one end wall 4 into the water vaporizing chamber 2, in the longitudinal center thereof, in suitably spaced relation to the grid plate 8 with upright jet nozzles 11 spaced along the same. A water control valve 11' is suitably interposed in the pipe 10.

A horizontal row of baffle plates 12 preferably of circular, inverted, dished form is provided in said vaporizing chamber 2, said baffle plates being vertically aligned with the nozzles 11, respectively, and substantially smaller in diameter than the width of the chamber 2 for a purpose presently seen. Transverse bracket bars 13 suitably fixed in the vaporizing chamber 2 support the row of baffle plates 12 above said nozzles 11 immediately below the line where the end walls 4 begin to converge.

Immediately below the water inlet pipe 10, a hot air blast pipe 14 extends through the beforementioned end wall 4 into the vaporizing chamber 2 parallel with the pipe 10, said pipe 14 having upstanding nozzles 15 thereon spaced along the same and staggered relative to the nozzles 11.

At the juncture of the legs 6 and 7, a cold air blast pipe line 16 extends into the leg 6 in axial alignment with the leg 7. A blast control valve 17 is suitably interposed in the pipe 16.

The tunnel formed by the leg 7 is provided, at the juncture of the leg 7 with the leg 6, with a transverse vertical baffle 18 in the bottom thereof, and at its outer end with a similar baffle 19 partly closing said end.

A cooling coil 20 is provided in said tunnel between the baffles 18 and 19 with opposite ends 21 extending through the top of said leg 7 for connection to apparatus, not shown, for pumping a suitable refrigerant through the coil 20.

A water discharge pipe 22 depends from the bottom of the leg 7, or tunnel, close to the baffle 18.

A solids discharge pipe 23 depends from the hopper bottom 3 of the vaporizing chamber 2. The hot air blast pipe 14 may be provided with a suitable blast control valve, not shown.

Referring now to the use and operation of the described apparatus, the water inlet pipe 10 is designed to be connected to a suitable source, not shown, of sea water under pressure to be forced out of the jets 11 in fine streams impinging against the baffle plates 12, whereby the water is broken up, or comminuted, into such finely divided form as to be substantially atomized into a vapor releasing solid contents, such as mineral particles, to fall onto the grid plate 8 and through the slots 9 therein onto the bottom 3 of said chamber 2 for gravity discharge of the solids out of the discharge pipe 23 into a suitable receptacle, not shown.

The hot air blast pipe 14 is designed to be connected to a suitable source of hot air under pressure to issue from the nozzles 15 and blow the vaporized water upwardly by way of the leg 6 into the tunnel formed by the leg 7. The hot air blast thus introduced into the vaporizing chamber 2 heats said chamber and thereby facilitates vaporizing the water. The cold air blast pipe 16 is to be connected to a suitable source of cold air under pressure, not shown, to blow the vapor as it rises in the leg 6 into the tunnel formed by the leg 7 and into and around the refrigerating, or cooling, coil 20, said cold air blast precooling the vapor and the said coil 20 further cooling the same so that the vapor is precipitated on the walls of the tunnel and on the coil to be condensed in said tunnel and flow along the same to discharge out of the water discharge pipe 22 into a suitable tank or the like providing a storage medium.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. Apparatus for separating minerals and the like from sea water comprising a closed casing forming a vaporizing chamber and having a reduced outlet in the top thereof, a pressure line extending into said casing adjacent the bottom thereof for discharging sea water into said chamber and having a horizontal row of jet-forming nozzles upstanding therefrom, a horizontal row of dished baffle plates in said casing vertically aligned with said nozzles, an elbow-type conduit having a leg arising from the outlet at the top of the casing and a lateral leg forming a tunnel, and having an outlet for condensate in the bottom thereof, a cooling coil in said tunnel-forming leg, and baffle means in said tunnel-forming leg for confining condensate therein to cause the condensate to flow out of said outlet.

2. Apparatus for separating minerals and the like from sea water comprising a closed casing forming a vaporizing chamber and having a reduced outlet in the top thereof, a pressure line extending into said casing adjacent the bottom thereof for discharging sea water into said chamber and having a horizontal row of jet-forming nozzles upstanding therefrom, a horizontal row of dished baffle plates in said casing vertically aligned with said nozzles, an elbow-type conduit having a leg arising from the outlet at the top of the casing and a lateral leg forming a tunnel, and having an outlet for condensate in the bottom thereof, a cooling coil in said tunnel-forming leg, means to introduce an upwardly directed hot air blast in said casing below said row of jets, and baffle means in said tunnel-forming leg for confining condensate therein to cause the condensate to flow out of said outlet.

3. Apparatus for separating minerals and the like from sea water comprising a closed casing forming a vaporizing chamber and having a reduced outlet in the top thereof, a pressure line extending into said casing adjacent the bottom thereof for discharging sea water into said chamber and having a horizontal row of jet-forming nozzles upstanding therefrom, a horizontal row of dished baffle plates in said casing vertically aligned with said nozzles, an elbow-type conduit having a leg arising from the outlet at the top of the casing and a lateral leg forming a tunnel, and having an outlet for condensate in the bottom thereof, a cooling coil in said tunnel-forming leg, means to introduce a cold air blast in said conduit at the juncture of said legs and in line with the tunnel-forming leg, and means in said tunnel-forming leg for confining condensate therein to cause the condensate to flow out of said outlet.

4. Apparatus for separating minerals and the like from sea water comprising a closed casing forming a vaporizing chamber and having a reduced outlet in the top thereof, a pressure line extending into said casing adjacent the bottom thereof for discharging sea water into said chamber and having a horizontal row of jet-forming nozzles upstanding therefrom, a horizontal row of dished baffle plates in said casing vertically aligned with said nozzles, an elbow-type conduit having a leg arising from the outlet at the top of the casing and a lateral leg forming a tunnel, and having an outlet for condensate in the bottom thereof, a cooling coil in said tunnel-forming leg, means to introduce an upwardly directed hot air blast in said casing below said row of jets including a hot air line and a plurality of jet-forming nozzles upstanding from said line, and means in said tunnel-forming leg for confining condensate therein to cause the condensate to flow out of said outlet.

HAYES WEIDNER.